United States Patent [19]

Hanson

[11] 4,033,669

[45] July 5, 1977

[54] PRECISION OPTICAL FIBER SWITCH

[75] Inventor: Delon C. Hanson, Los Altos, Calif.

[73] Assignee: Hewlett-Packard Company, Palo Alto, Calif.

[22] Filed: Mar. 11, 1976

[21] Appl. No.: 665,974

[52] U.S. Cl. .............................................. 350/96 C
[51] Int. Cl.[2] .......................................... G02B 5/14
[58] Field of Search ......... 350/96 C, 96 WG, 96 B, 350/96 R

[56] References Cited

UNITED STATES PATENTS 3,960,531   6/1976   Kohanzadeh et al. ....... 350/96 C X

FOREIGN PATENTS OR APPLICATIONS 1,946,693   8/1970   Germany .......................... 350/96 B Primary Examiner—David H. Rubin
Attorney, Agent, or Firm—F. D. LaRiviere

[57] ABSTRACT

In a half-duplex or multi-channel optical transmission line, parallel rods, which retain and concentrically align movable and stationary fibers, form a precise switch detent for reproducibly switching a movable fiber from one to another of a plurality of stationary fibers.

4 Claims, 3 Drawing Figures

PRECISION OPTICAL FIBER SWITCH

BACKGROUND OF THE INVENTION

Optical fiber connectors seek to couple light transmitted in one fiber to another by end-to-end mechanical coupling of the two fibers to form a continuous transmission channel with low insertion losses. One such coupler described in "Low Loss Splicing and Connection of Optical Waveguide Cables" by Robert M. Hawk and Frank L. Thiel, SPIE Vol. 63 (1975) Guided Optical Communications, pp. 109–113, employs parallel rods to retain and concentrically align the end of the fibers to be coupled. Three rods will retain and align one fiber channel, but each rod may retain and align as many as 6 fiber channels in a multi-channel connector.

The cost of optical fiber transmission cable is high. Half-duplex communication systems, i.e., communication in both directions but only one direction at a time, effectively reduces the cost of cable since such a system requires only one fiber per two-way channel. However, such systems also require switches at each end of each channel. Such optical fiber switches should provide 1) precise, positive mechanical stops to achieve consistently reproducible coupling loss; 2) low loss in each position, substantially equal to the loss of a precision optical connector; 3) high isolation between ports; 4) relatively fast switching time; and 5) low cost, at least relative to the optical fiber it replaces.

SUMMARY OF THE INVENTION

An optical fiber switch constructed according to the preferred embodiment of the present invention precisely retains the movable fiber along the longitudinal axis of an assembly of three rods to form the switch wiper assembly. The outside diameter of each rod is machined to high tolerance by centerless grinding techniques. A plurality of stationary fibers are similarly retained by a plurality of similarly formed rods of approximately the same diameter. The diameter of the fiber determines the diameter of each rod. Each rod of the outer layer of stationary fiber retaining rods is lengthened to form a housing and precise switch detents within which the movable fiber is aligned with a stationary fiber by engagement of the wiper rods with the outer layer rods of the housing. One outer layer is movably mounted in the housing assembly to permit slidable and rotatable movement of the wiper assembly from one position to another within the housing.

The optical fiber switch of this invention corresponds to microwave switching components and may be used as the basic building block for precision optical step attenuators and optical instruments designed to measure the attenuation loss of optical fibers with remote terminations. By incorporating a series of such switched attenuators, the dynamic range of receivers may be evaluated and the dynamic operating range of cable test instrumentation may be greatly reduced.

DESCRIPTION OF THE PREFERRED EMBODIMENT

Figure 1:
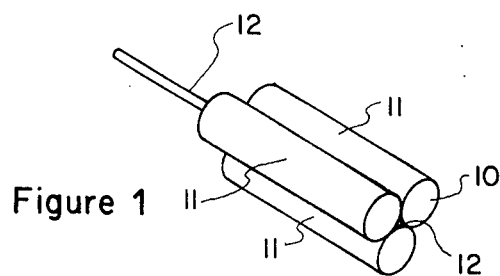
FIG. 1 is a perspective view of the wiper assembly of an optical fiber switch constructed according to the preferred embodiment of the present invention.
Figure 3:
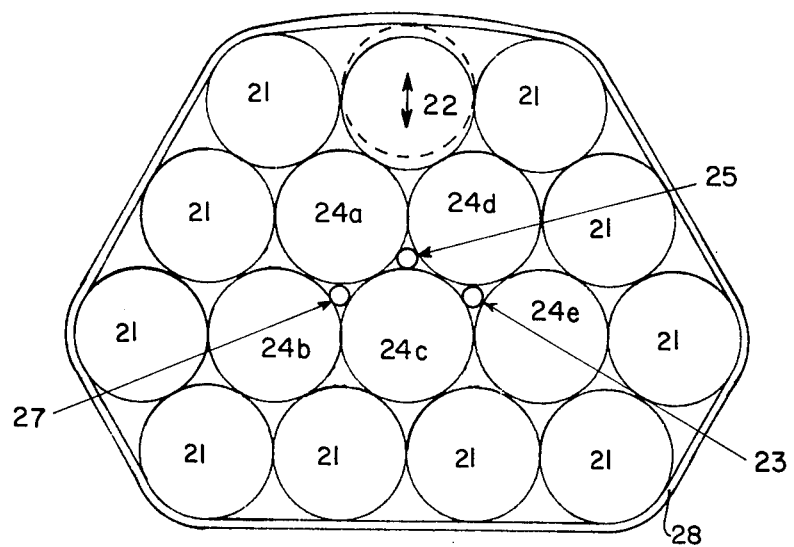
FIG. 3 is an end view of the open end of the housing assembly of FIG. 2.

Referring to FIG. 1, wiper assembly 10 comprises three rods 11 assembled for retaining optical fiber 12 along the longitudinal axis of the assembly. Fiber 12 is just contacted by rods 11 which may be made of any suitable, optically-opaque material. For proper retention of the fiber, the diameter of rods 11 must be precision ground to a high-tolerance diameter approximately 6.4641 times the fiber diameter. Centerless grinding techniques can provide the required precision. The material selected, therefore, should be inelastic, capable of being machined and polished to provide a substantially smooth surface.

Figure 2:
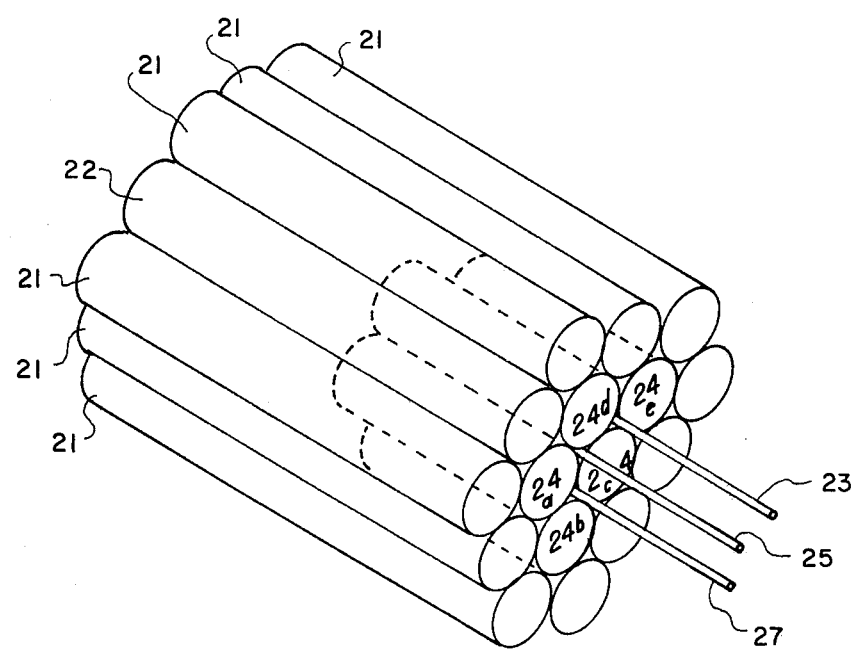
FIG. 2 is a perspective view of the housing assembly of an optical fiber switch constructed according to the preferred embodiment of the present invention.

Referring now to FIG. 2, housing assembly 20 comprises ten rods 21, all substantially the same diameter as rods 11 of FIG. 1, rod 22, and rods 24, also substantially the same diameter as rods 11, for retaining optical fibers 23, 25, 27 in the same way rods 11 retain fiber 12. Fibers 23, 25 and 27 are approximately the same diameter as fiber 12. Rods 21, 22 and 24 should be of the same material and formed in substantially the same manner as rods 11, except that rods 24 are shorter.

One end of rods 24 are blocked with the ends of rods 21 to form the closed end of a cavity within the assembly of rods 21. Rods 11 of wiper 10 slidably contact rods 21 when inserted in the cavity. The ends of fibers 23, 25 and 27 are cut, suitably polished and blocked with the other ends of rods 24.

Rod 22 is movably mounted in position (e.g. a flexible girth 28 of a leaf spring) to move in response and orthogonally to the movement of wiper 10 from position-to-position in the cavity. Fiber 12 is aligned end-to-end with fiber 27 when rods 11 are aligned end-to-end with rods 24a, 24b and 24c (position 1). Similarly, fiber 12 is aligned with fiber 23 when rods 11 are aligned with rods 24d, 24c and 24e (position 2). Wiper assembly 10 moves approximately 1.05 times the rod 11 diameter when switched from position 1 to position 2.

Finally, a third position is achieved if desired by aligning fiber 12 with fiber 25 by rotating wiper 10 120° to align rods 11 with rods 24a, 24d and 24c. The wiper may be moved to position 1 or 2 by rotating wiper 10 120° counter clockwise or clockwise respectively.

I claim:

1. An optical fiber switch having at least two positions for end-to-end coupling of optical fibers, said switch comprising:

a wiper assembly having at least three rods of substantially the same diameter and in substantially contiguous parallel relationship for retaining and aligning an optical fiber in the interspace therebetween;

a housing assembly having at least five retaining rods of substantially the same diameter and in substantially contiguous parallel relationship for retaining and aligning at least two optical fibers in the interspace therebetween, and at least ten fixed rods of substantially the same diameter and in substantially contiguous parallel relationship for retaining and aligning the retaining rods and wiper assembly;

a detent assembly including at least one rod and means for movably mounting same on the housing assembly to move in response and orthogonally to the movement of the wiper assembly as it moves from one position to another;

said wiper, housing said detent rods being substantially the same diameter.

2. An optical fiber switch as in claim 1 further including a third position wherein:
  the housing assembly retains and aligns a third optical fiber; and
  the wiper assembly when in the third position, is rotated 120° relative to either of the other two positions.

3. An optical fiber switch as in claim 1 wherein the length of the fixed rods is longer than the retaining rods.

4. An optical fiber switch as in claim 1 wherein:
  the diameter of the optical fibers is substantially the same; and
  the diameter of the wiper, retaining, fixed and movable rods is approximately 6.4641 times larger than the diameter of the optical fibers.

* * * * *